US012683046B2

(12) United States Patent
Akiyama et al.

(10) Patent No.: US 12,683,046 B2
(45) Date of Patent: Jul. 14, 2026

(54) MULTILAYER VARISTOR

(71) Applicant: Panasonic Intellectual Property Management Co., Ltd., Osaka (JP)

(72) Inventors: Yuto Akiyama, Hokkaido (JP); Ken Yanai, Hokkaido (JP); Masashi Takamura, Hokkaido (JP); Yuji Yamagishi, Hokkaido (JP); Ryosuke Usui, Hokkaido (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 586 days.

(21) Appl. No.: 18/173,598

(22) Filed: Feb. 23, 2023

(65) Prior Publication Data

US 2023/0274864 A1 Aug. 31, 2023

(30) Foreign Application Priority Data

Feb. 28, 2022 (JP) ................................ 2022-030360

(51) Int. Cl.
*H01C 7/102* (2006.01)
*H01C 7/18* (2006.01)

(52) U.S. Cl.
CPC ............... *H01C 7/102* (2013.01); *H01C 7/18* (2013.01)

(58) Field of Classification Search
CPC .................................. H01C 7/102; H01C 7/18
See application file for complete search history.

(56) References Cited

U.S. PATENT DOCUMENTS 4,064,475 A 12/1977 Kouchich et al.
6,260,258 B1 * 7/2001 Tokunaga .............. H01C 17/02 338/21
9,959,975 B2 * 5/2018 Inoue ................... H01G 4/1209
2003/0043012 A1 * 3/2003 Shiraishi ................ H01C 7/102 338/21

(Continued)

FOREIGN PATENT DOCUMENTS

JP H05-047510 A 2/1993
JP 2000-164406 A 6/2000

(Continued)

OTHER PUBLICATIONS

Non-Final Office Action dated Aug. 8, 2025 issued in related U.S. Appl. No. 18/173,584.

(Continued)

*Primary Examiner* — Kyung S Lee
(74) *Attorney, Agent, or Firm* — Rimon P.C.

(57) ABSTRACT

A multilayer varistor according to the present disclosure includes: a sintered compact having, on a surface thereof, at least one planar portion and at least one corner portion; an internal electrode provided inside the sintered compact; a high-resistivity layer arranged to cover the at least one planar portion and the at least one corner portion of the sintered compact at least partially; and an external electrode arranged to cover the high-resistivity layer partially and electrically connected to the internal electrode. The high-resistivity layer includes: a first high-resistivity layer covering the at least one planar portion; and a second high-resistivity layer covering the at least one corner portion. The first high-resistivity layer has a larger average thickness than the second high-resistivity layer.

9 Claims, 2 Drawing Sheets

(56) References Cited

U.S. PATENT DOCUMENTS

| | | | | |
|---|---|---|---|---|
| 2004/0119579 | A1* | 6/2004 | Takehana | H01C 17/283 338/20 |
| 2016/0090661 | A1* | 3/2016 | Kitada | H01C 7/021 338/22 R |
| 2023/0143255 | A1* | 5/2023 | Akiyama | H01C 7/105 338/20 |

FOREIGN PATENT DOCUMENTS

| | | |
|---|---|---|
| JP | 2003-017374 A | 1/2003 |
| JP | 2004-023090 A | 1/2004 |
| JP | 2005-251993 A | 9/2005 |
| JP | 2010-027804 A | 2/2010 |
| JP | 2013-197509 A | 9/2013 |
| JP | 2017-005232 A | 1/2017 |

OTHER PUBLICATIONS

Notice of Reasons for Refusal dated Oct. 7, 2025 issued in the corresponding Japanese Patent Application No. 2022-030360, with English translation.

Notice of Reasons for Refusal dated Sep. 9, 2025 issued in the corresponding Japanese Patent Application No. 2022-030359, with English translation.

Office Action issued on Feb. 24, 2026 for the corresponding U.S. Appl. No. 18/173,584.

* cited by examiner

MULTILAYER VARISTOR

CROSS-REFERENCE TO RELATED APPLICATIONS

The present application is based upon, and claims the benefit of priority to, Japanese Patent Application No. 2022-030360, filed on Feb. 28, 2022, the entire contents of which are hereby incorporated by reference.

TECHNICAL FIELD

The present disclosure generally relates to a multilayer varistor, and more particularly relates to a multilayer varistor including a sintered compact, internal electrodes, a high-resistivity layer, and external electrodes.

BACKGROUND ART

Multilayer varistors have been used to, for example, protect various types of electronic equipment and electronic devices from an abnormal voltage generated by lighting surge or static electricity, for example, and prevent the various types of electronic equipment and electronic devices from malfunctioning due to noise generated in a circuit.

JP 2000-164406 A discloses a chip-shaped electronic component including an underlying electrode layer, a glass coating, an external electrode layer, and an electrically conductive material. The underlying electrode layer contains a glass material and is formed in a region, where an external electrode will be formed, of a ceramic element. The glass coating is formed to overlap with at least this underlying electrode layer. The external electrode layer, also containing a glass material, is formed over the underlying electrode layer with the glass coating interposed between them. The electrically conductive material is dispersed in the glass coating interposed between the underlying electrode layer and the external electrode layer to make the underlying electrode layer and the external electrode layer electrically conductive with each other.

JP H05-47510 A discloses a chip varistor. The chip varistor includes a plurality of internal electrodes embedded in a ceramic sintered compact. The plurality of internal electrodes are respectively electrically connected to external electrodes formed on both end faces of the sintered compact, thus making the chip varistor serve as a voltage nonlinear resistor. In the chip varistor, the sintered compact includes, at the corners thereof, chamfered portions with a radius equal to or greater than 0.1 mm and a glass film is formed on an external surface of the sintered compact.

The multilayer varistor, as well as the chip-shaped electronic component of JP 2000-164406 A and the chip varistor of JP H05-47510 A, usually has a structure including a high-resistivity layer such as a glass coating layer and external electrodes.

The multilayer varistor includes the high-resistivity layer, and therefore, may reduce deposition of the plating. In such a varistor, however, migration could be caused on the surface of the high-resistivity layer between the external electrodes upon the application of voltage in a humid environment.

SUMMARY

The present disclosure provides a multilayer varistor with the ability to reduce the chances of causing migration on the surface of the high-resistivity layer.

A multilayer varistor according to an aspect of the present disclosure includes: a sintered compact having, on a surface thereof, at least one planar portion and at least one corner portion; an internal electrode provided inside the sintered compact; a high-resistivity layer arranged to cover the at least one planar portion and the at least one corner portion of the sintered compact at least partially; and an external electrode arranged to cover the high-resistivity layer partially and electrically connected to the internal electrode. The high-resistivity layer includes: a first high-resistivity layer covering the at least one planar portion; and a second high-resistivity layer covering the at least one corner portion. The first high-resistivity layer has a larger average thickness than the second high-resistivity layer.

A multilayer varistor according to another aspect of the present disclosure includes: a sintered compact having, on a surface thereof, at least one planar portion and at least one corner portion; an internal electrode provided inside the sintered compact; a high-resistivity layer arranged to cover the at least one planar portion and the at least one corner portion of the sintered compact at least partially; and an external electrode arranged to cover the high-resistivity layer partially and electrically connected to the internal electrode. The high-resistivity layer includes: a first high-resistivity layer covering the at least one planar portion; and a second high-resistivity layer covering the at least one corner portion. The first high-resistivity layer has a larger arithmetic mean surface roughness than the second high-resistivity layer.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION

1. Overview

A multilayer varistor according to an exemplary embodiment of the present disclosure will now be described with reference to the accompanying drawings. The drawings to be referred to in the following description of embodiments are all schematic representations. Thus, the ratio of the dimensions (including thicknesses) of respective constituent elements illustrated on the drawings does not always reflect their actual dimensional ratio.

To overcome the problem described above, the present inventors carried out extensive research and development on respective constituent elements of a multilayer varistor. As a result, the present inventors discovered that in a multilayer varistor 1 including a high-resistivity layer 13 that covers a sintered compact 11 having, on its surface, planar portions and corner portions, there is correlation between the thicknesses of respective parts of the high-resistivity layer 13 and the arithmetic mean surface roughness (Ra) and the degree to which the chances of causing migration are reduced, thus conceiving the concept of the present disclosure.

Figure 1:
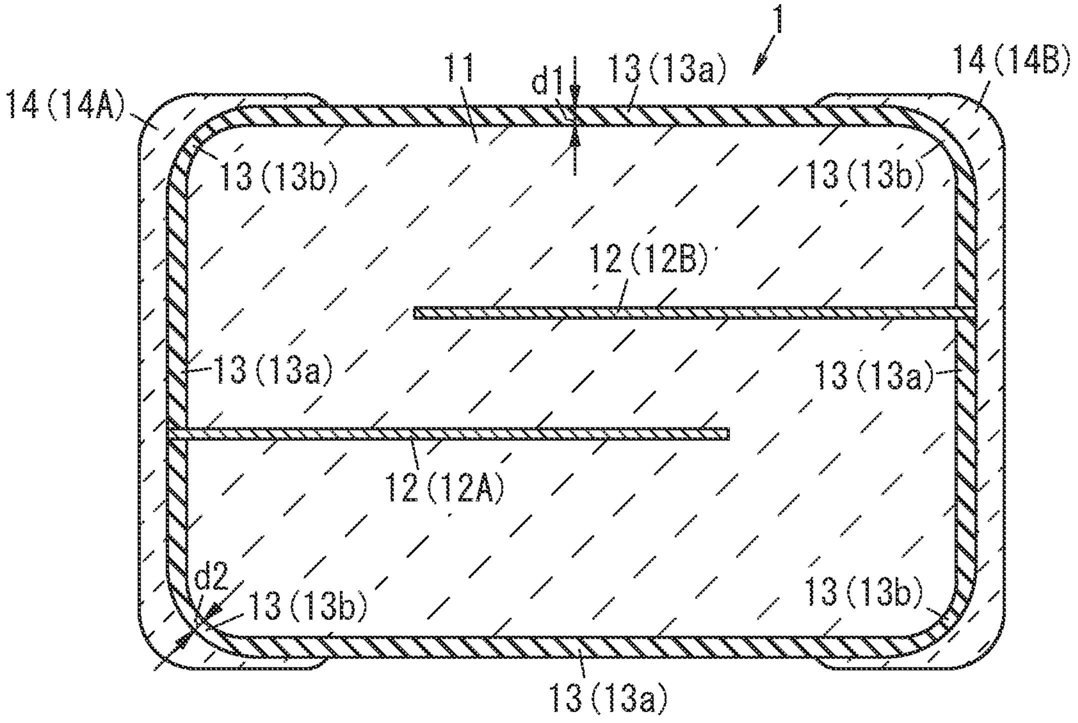
FIG. 1 is schematic cross-sectional view of a multilayer varistor according to an exemplary embodiment of the present disclosure.

A multilayer varistor 1 according to this embodiment includes a sintered compact 11, internal electrodes 12, a high-resistivity layer 13, and external electrodes 14 as shown in FIG. 1. The high-resistivity layer 13 includes a first high-resistivity layer 13*a* covering planar portions of the sintered compact 11 and a second high-resistivity layer 13*b* covering corner portions of the sintered compact 11.

First Embodiment

A multilayer varistor 1 according to a first embodiment of the present disclosure is characterized in that the first high-resistivity layer 13*a* has a larger average thickness than the second high-resistivity layer 13*b*.

The multilayer varistor 1 according to the first embodiment, having such a configuration, may reduce the chances of causing migration on the surface of the high-resistivity layer 13. In general, migration is more likely to be caused in the first high-resistivity layer 13*a* than in the second high-resistivity layer 13*b*. However, making the first high-resistivity layer 13*a* thicker than the second high-resistivity layer 13*b* would reduce the chances of causing migration in the entire high-resistivity layer 13 of the multilayer varistor 1.

In addition, the multilayer varistor 1 according to the first embodiment may also reduce the chances of causing cracks and thereby increase the mechanical strength by making the first high-resistivity layer 13*a* thicker than the second high-resistivity layer 13*b* (i.e., by decreasing the thickness of the second high-resistivity layer 13*b*). Furthermore, in the multilayer varistor 1 according to the first embodiment, the high-resistivity layer 13 is thinnest in the second high-resistivity layer 13*b*. This allows evaluating the coating quality of the entire multilayer varistor 1 by inspecting only the corner portions thereof, thus contributing to simplifying the inspection process.

Second Embodiment

A multilayer varistor 1 according to a second embodiment of the present disclosure is characterized in that the first high-resistivity layer 13*a* has a larger arithmetic mean surface roughness (Ra) than the second high-resistivity layer 13*b*.

The multilayer varistor 1 according to the second embodiment, having such a configuration, may reduce the chances of causing migration on the surface of the high-resistivity layer 13. In general, migration is more likely to be caused in the first high-resistivity layer 13*a* than in the second high-resistivity layer 13*b*. However, making the Ra value of the first high-resistivity layer 13*a* larger than that of the second high-resistivity layer 13*b* would reduce the chances of causing migration in the entire high-resistivity layer 13 of the multilayer varistor 1.

In addition, the second embodiment also ensures sufficient mounting strength thanks to anchoring effect, for example, by making the Ra value of the first high-resistivity layer 13*a* larger than that of the second high-resistivity layer 13*b* (i.e., making the surface of the first high-resistivity layer 13*a* rougher than the surface of the second high-resistivity layer 13*b*) and thereby allowing flux to remain on the surface of the high-resistivity layer 13. Furthermore, according to the second embodiment, setting the surface roughness of the second high-resistivity layer 13*b*, placing a heavier load per unit area than the first high-resistivity layer 13*a*, at a smaller value than that of the first high-resistivity layer 13*a* with respect to a packaging carrier tape for use to pack the multilayer varistor 1 enables reducing the contamination to be caused by the shavings off the surface of the tape.

Thus, the present disclosure provides a multilayer varistor with the ability to reduce the chances of causing migration on the surface of the high-resistivity layer.

2. Details

<Multilayer Varistor>

First Embodiment

The multilayer varistor 1 according to the first embodiment includes the sintered compact 11, the internal electrodes 12, the high-resistivity layer 13, and the external electrodes 14. Optionally, the multilayer varistor 1 may further include a plated electrode which covers the external electrodes 14 at least partially.

The sintered compact 11 is made of a semiconductor ceramic component with a nonlinear resistance characteristic.

The multilayer varistor 1 may include at least one pair of external electrodes 14. In this embodiment, the pair of external electrodes 14 consists of a first external electrode 14A provided on one end face of the sintered compact 11 and a second external electrode 14B provided on the other end face of the sintered compact 11. When a voltage is applied between the first external electrode 14A and the second external electrode 14B, one of the first and second external electrodes 14A, 14B comes to have the higher potential and the other of the first and second external electrodes 14A, 14B comes to have the lower potential.

The internal electrode(s) 12 may be provided such that one internal electrode 12 or a plurality of internal electrodes 12 is/are connected to the external electrodes 14. In the multilayer varistor 1 shown in FIG. 1, the number of the internal electrodes 12 provided is two. That is to say, the internal electrodes 12 consist of a first internal electrode 12A and a second internal electrode 12B. The first internal electrode 12A is electrically connected to the first external electrode 14A while the second internal electrode 12B is electrically connected to the second external electrode 14B.

The at least two external electrodes 14 are mounted on a printed wiring board on which an electric circuit is formed. The multilayer varistor 1 may be connected to, for example, the input end of the electric circuit. Upon the application of a voltage higher than a predetermined threshold voltage to between the first external electrode 14A and the second external electrode 14B, the electrical resistance between the first external electrode 14A and the second external electrode 14B decreases steeply to cause an electric current to flow through a varistor layer. This enables protecting the electric circuit that follows the multilayer varistor 1.

[Sintered Compact]

The sintered compact 11 has, on its surface, at least one planar portion and at least one corner portion. On the surface of the sintered compact 11, the "planar portion" herein refers to a flat surface portion and the "corner portion" herein refers to a boundary portion where two planar portions are adjacent to each other while forming a certain angle between themselves.

Specifically, the sintered compact 11 may have a rectangular parallelepiped shape, for example, having a pair of principal surfaces facing each other, a pair of side surfaces facing each other, and a pair of end surfaces facing each other. The rectangular parallelepiped sintered compact 11 has six planar portions and twelve corner portions. Each of the corner portions may have a curved shape (e.g., rounded).

The semiconductor ceramic component having a nonlinear resistance characteristic as a constituent component for the sintered compact 11 may contain, for example, ZnO as a main component thereof and $Bi_2O_3$, $CO_2O_3$, $MnO_2$, $Sb_2O_3$, $Pr_2O_3$, $Pr_6O_{11}$, $CaCO_3$, and $Cr_2O_3$ as sub-components thereof. The varistor layer constituting the sintered compact 11 may be formed by, for example, baking a ceramic sheet containing these components to cause the main component such as ZnO to be sintered and form a solid solution with some of these sub-components and to cause the other sub-components to deposit on the grain boundary.

[Internal Electrodes]

The internal electrodes 12 are provided inside the sintered compact 11. Each of the internal electrodes 12 may be formed by, for example, stacking multiple ceramic sheets, each of which contains Ag, Pd, PdAg, or PtAg, for example, and to which an internal electrode paste is usually applied, one on top of another and baking the stack.

[High-Resistivity Layer]

The high-resistivity layer 13 has higher resistivity than the sintered compact 11. The high-resistivity layer 13 is arranged to cover the planar portions and corner portions of the sintered compact 11 at least partially. Alternatively, the high-resistivity layer 13 may also be provided to cover the planar portions and corner portions of the sintered compact 11 entirely.

The high-resistivity layer 13 includes a first high-resistivity layer 13*a* and a second high-resistivity layer 13*b*. The first high-resistivity layer 13*a* forms parts, covering the planar portions of the sintered compact 11, of the high-resistivity layer 13. The second high-resistivity layer 13*b* forms parts, covering the corner portions of the sintered compact 11, of the high-resistivity layer 13. The first high-resistivity layer 13*a* usually has a flat shape. The second high-resistivity layer 13*b* usually has a curved surface shape such as a rounded shape.

In the multilayer varistor 1 according to the first embodiment, it is important that the first high-resistivity layer 13*a* has a larger average thickness than the second high-resistivity layer 13*b*. This may reduce the chances of causing migration in the high-resistivity layer 13 in the multilayer varistor 1. As used herein, the "average thickness" refers to an arithmetic mean of the thicknesses of the first or second high-resistivity layer 13*a*, 13*b* as measured at multiple points (e.g., at ten arbitrary points) of the first or second high-resistivity layer 13*a*, 13*b*. In FIG. 1, the thickness of the first high-resistivity layer 13*a* is indicated by d1 and the thickness of the second high-resistivity layer 13*b* is indicated by d2.

The ratio of the average thickness of the first high-resistivity layer 13*a* to the average thickness of the second high-resistivity layer 13*b* is preferably greater than 1 and equal to or less than 10. This may further reduce the chances of causing migration in the high-resistivity layer 13. The ratio is more preferably greater than 1 and equal to or less than 5 and even more preferably greater than 1 and equal to or less than 2.

The average thickness of the second high-resistivity layer 13*b* is preferably equal to or greater than 0.007 μm and equal to or less than 3.3 μm. This may further reduce the chances of causing migration while reducing the chances of causing cracks. The average thickness of the second high-resistivity layer 13*b* is more preferably equal to or greater than 0.03 μm and equal to or less than 2.7 μm and even more preferably equal to or greater than 0.07 μm and equal to or less than 2 μm.

The average thickness of the first high-resistivity layer 13*a* is preferably equal to or greater than 0.01 μm and equal to or less than 5 μm. This may further reduce the chances of causing migration in the first high-resistivity layer 13*a*, thereby further reducing the chances of causing migration in the high-resistivity layer 13. The average thickness of the first high-resistivity layer 13*a* is more preferably equal to or greater than 0.05 μm and equal to or less than 4 μm and even more preferably equal to or greater than 0.1 μm and equal to or less than 3 μm.

The Ra value of the first high-resistivity layer 13*a* is preferably greater than the Ra value of the second high-resistivity layer 13*b*. This may further reduce the chances of causing migration in the first high-resistivity layer 13*a*, thereby further reducing the chances of causing migration in the high-resistivity layer 13. The Ra values of the first high-resistivity layer 13*a* and the second high-resistivity layer 13*b* may be measured by the method compliant with the JIS-B0601:2013 standard. Specifically, the Ra values may be measured with a high-precision roughness measuring instrument Surfcorder™ ET4000A manufactured by Kosaka Laboratory Ltd. Alternatively, the Ra values may also be measured through a scanning probe microscope or with a non-contact laser microscope, for example.

Examples of a method for forming the high-resistivity layer 13 include (i) applying a solution containing a precursor of the high-resistivity layer 13 onto the sintered compact 11 and (ii) allowing $SiO_2$ to react with the sintered compact 11 containing ZnO as a main component thereof.

According to the method (i), the high-resistivity layer 13 may be formed on the surface of the sintered compact 11 by, for example, applying a solution containing a precursor of the high-resistivity layer 13 onto the sintered compact 11 and then performing dehydration and curing. The precursor of the high-resistivity layer 13 may be a glass component having element Si on a main chain of polysilazane, for example. A continuous high-resistivity layer 13 containing $SiO_2$ as a main component thereof may be formed by using, as the precursor of the high-resistivity layer 13, a glass component having element Si on a main chain of polysilazane, for example. Examples of a method for applying such a solution containing a precursor of the high-resistivity layer 13 include spraying, immersion, and printing.

According to the method (ii), the high-resistivity layer 13 may be formed by allowing $SiO_2$ to react with the sintered compact 11 containing ZnO as a main component thereof and thereby turning a surface region of the sintered compact 11 into a high-resistivity layer 13 including $Zn_2SiO_4$ as a main component thereof. Specifically, this method may be carried out by causing a powder or liquid containing $SiO_2$ to adhere onto the sintered compact 11 including ZnO as a main component thereof and then conducting heat treatment, for example.

The thicknesses of the first high-resistivity layer 13*a* and the second high-resistivity layer 13*b* in the multilayer varistor 1 according to the first embodiment may be controlled by selecting an appropriate method or apparatus for forming the high-resistivity layer 13.

[External Electrodes]

The external electrodes 14 are arranged to cover the high-resistivity layer 13 partially. Also, the external electrodes 14 are electrically connected to the internal electrodes 12.

Each of the external electrodes 14 (namely, the first external electrode 14A and the second external electrode 14B) may have a single-layer structure consisting of only a primary electrode or a multilayer structure including a primary electrode and a secondary electrode arranged to cover the primary electrode, whichever is appropriate.

The external electrodes 14 each contain a metal component such as Ag, AgPd, or AgPt and a glass component such as $Bi_2O_3$, $SiO_2$, or $B_2O_5$. The external electrodes 14 preferably contain a metal as a main component thereof, and more preferably contain silver as the main component thereof. The external electrodes 14 are usually formed by either applying an external electrode paste onto respective parts of the high-resistivity layer 13 or immersing a part of the high-resistivity layer 13 in an external electrode paste.

Figure 2:
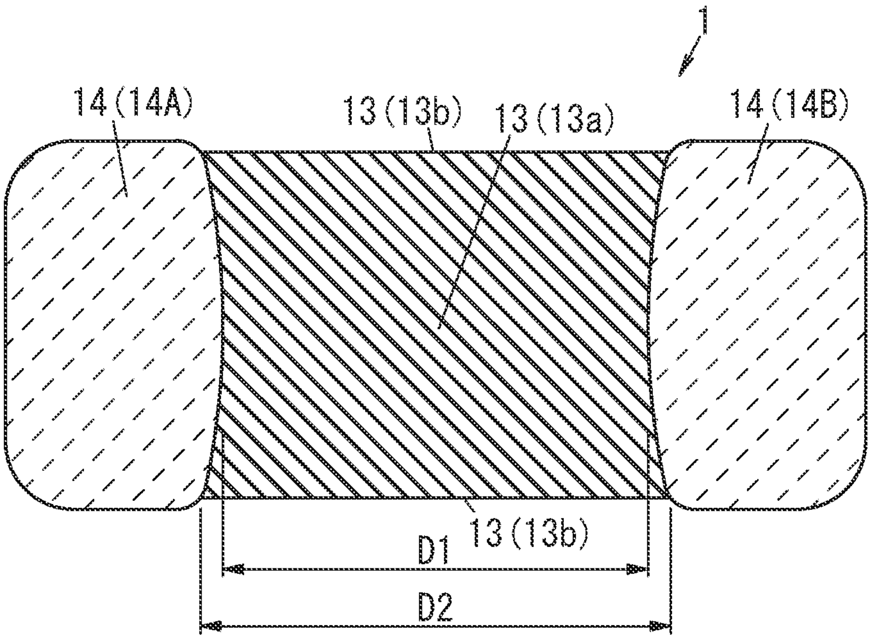
FIG. 2 is schematic side view of the multilayer varistor according to the exemplary embodiment.

If the multilayer varistor 1 has a configuration in which the sintered compact 11 thereof has a pair of end faces that face each other and a pair of external electrodes are provided as the external electrodes 14 to respectively cover the pair of end faces of the sintered compact 11 via the high-resistivity layer 13, then the distance measured, in a direction in which the pair of end faces face each other, between the pair of external electrodes 14 along the planar portions of the sintered compact 11 is preferably shorter than the distance measured, in the direction in which the pair of end faces face each other, between the pair of external electrodes 14 along the corner portions of the sintered compact 11. FIG. 2 is a side view of the multilayer varistor 1 having such a configuration. In FIG. 2, the distance measured between the pair of external electrodes 14 along the planar portions is indicated by D1 and the distance measured between the pair of external electrodes 14 along the corner portions is indicated by D2. In the known multilayer varistor, if the distance measured between the external electrodes along the planar portions of the sintered compact is short, then migration is highly likely to be caused. In contrast, adopting the configuration of the present disclosure reduces the chances of causing migration, thus achieving a significant advantage by applying the present disclosure.

[Plated Electrodes]

The plated electrodes are arranged to cover the external electrodes 14 at least partially. The plated electrodes may each include, for example, an Ni electrode arranged to cover an associated one of the external electrodes 14 at least partially and an Sn electrode arranged to cover the Ni electrode at least partially.

Second Embodiment

A multilayer varistor 1 according to a second embodiment includes the sintered compact 11, the internal electrodes 12, the high-resistivity layer 13, and the external electrodes 14. Optionally, plated electrodes may be arranged to cover the external electrodes 14 at least partially. The multilayer varistor 1 according to the second embodiment is the same as the multilayer varistor 1 according to the first embodiment except that the high-resistivity layer 13 of the second embodiment has different characteristics from its counterpart of the first embodiment.

Next, the high-resistivity layer 13 of the multilayer varistor 1 according to the second embodiment will be described.

[High-Resistivity Layer]

In the multilayer varistor 1 according to the second embodiment, it is important that the first high-resistivity layer 13*a* has a larger Ra value than the second high-resistivity layer 13*b*. This may reduce the chances of causing migration in the high-resistivity layer 13 of the multilayer varistor 1.

The ratio of the Ra value of the first high-resistivity layer 13*a* to the Ra value of the second high-resistivity layer 13*b* is preferably greater than 1 and equal to or less than 10. This may further reduce the chances of causing migration in the high-resistivity layer 13. The ratio is more preferably greater than 1 and equal to or less than 5 and even more preferably greater than 1 and equal to or less than 2.

The Ra value of the second high-resistivity layer 13*b* is preferably equal to or greater than 0.04 μm and equal to or less than 0.6 μm. This enables lightening the local load to be placed on a packaging carrier tape, thus further reducing the contamination to be caused by the shavings off the surface of the tape. The Ra value is more preferably equal to or greater than 0.05 μm and equal to or less than 0.5 μm and even more preferably equal to or greater than 0.08 μm and equal to or less than 0.3 μm.

The Ra value of the first high-resistivity layer 13*a* is preferably equal to or greater than 0.06 μm and equal to or less than 0.9 μm. This may further reduce the chances of causing migration in the first high-resistivity layer 13*a*, thus further reducing the chances of causing migration in the high-resistivity layer 13. The Ra value is more preferably equal to or greater than 0.08 μm and equal to or less than 0.8 μm and even more preferably equal to or greater than 0.12 μm and equal to or less than 0.5 μm.

The Ra values of the first high-resistivity layer 13*a* and the second high-resistivity layer 13*b* in the multilayer varistor 1 according to the second embodiment may be controlled by selecting an appropriate method or apparatus for forming the high-resistivity layer 13.

(Recapitulation)

As can be seen from the foregoing description of the exemplary embodiment, a multilayer varistor (1) according to a first aspect includes: a sintered compact (11) having, on a surface thereof, at least one planar portion and at least one corner portion; an internal electrode (12) provided inside the sintered compact (11); a high-resistivity layer (13) arranged to cover the at least one planar portion and the at least one corner portion of the sintered compact (11) at least partially; and an external electrode (14) arranged to cover the high-resistivity layer (13) partially and electrically connected to the internal electrode (12). The high-resistivity layer (13) includes: a first high-resistivity layer (13*a*) covering the at least one planar portion; and a second high-resistivity layer (13*b*) covering the at least one corner portion. The first high-resistivity layer (13*a*) has a larger average thickness than the second high-resistivity layer (13*b*).

The first aspect enables reducing the chances of causing migration on the surface of the high-resistivity layer (13). In addition, the first aspect also enables increasing the mechanical strength by reducing the chances of causing cracks. Furthermore, the first aspect allows evaluating the coating quality of the entire multilayer varistor (1) by inspecting only the corner portions thereof, thus contributing to simplifying the inspection process.

In a multilayer varistor (1) according to a second aspect, which may be implemented in conjunction with the first aspect, the second high-resistivity layer (13*b*) has an average thickness equal to or greater than 0.007 μm and equal to or less than 3.3 μm.

The second aspect enables further reducing the chances of causing migration while further reducing the chances of causing cracks.

In a multilayer varistor (1) according to a third aspect, which may be implemented in conjunction with the first or second aspect, the first high-resistivity layer (13*a*) has an average thickness equal to or greater than 0.01 μm and equal to or less than 5 μm.

The third aspect enables further reducing the chances of causing migration in the first high-resistivity layer (13*a*) and eventually reducing the chances of causing migration in the entire high-resistivity layer (13).

In a multilayer varistor (1) according to a fourth aspect, which may be implemented in conjunction with any one of the first to third aspects, the first high-resistivity layer (13*a*) has a larger arithmetic mean surface roughness than the second high-resistivity layer (13*b*).

The fourth aspect enables further reducing the chances of causing migration in the first high-resistivity layer (13*a*) and eventually reducing the chances of causing migration in the entire high-resistivity layer (13).

A multilayer varistor (1) according to a fifth aspect includes: a sintered compact (11) having, on a surface thereof, at least one planar portion and at least one corner portion; an internal electrode (12) provided inside the sintered compact (11); a high-resistivity layer (13) arranged to cover the at least one planar portion and the at least one corner portion of the sintered compact (11) at least partially; and an external electrode (14) arranged to cover the high-resistivity layer (13) partially and electrically connected to the internal electrode (12). The high-resistivity layer (13) includes: a first high-resistivity layer (13*a*) covering the at least one planar portion; and a second high-resistivity layer (13*b*) covering the at least one corner portion. The first high-resistivity layer (13*a*) has a larger arithmetic mean surface roughness than the second high-resistivity layer (13*b*).

The fifth aspect enables reducing the chances of causing migration on the surface of the high-resistivity layer (13). In addition, the fifth aspect also ensures sufficient mounting strength thanks to anchoring effect, for example, by allowing flux to remain on the surface of the high-resistivity layer (13). Furthermore, according to the fifth aspect, setting the surface roughness of the second high-resistivity layer (13*b*), placing a heavier load per unit area than the first high-resistivity layer (13*a*), at a smaller value than that of the first high-resistivity layer (13*a*) with respect to a packaging carrier tape for use to pack the multilayer varistor (1) enables reducing the contamination to be caused by the shavings off the surface of the tape.

In a multilayer varistor (1) according to a sixth aspect, which may be implemented in conjunction with the fifth aspect, the second high-resistivity layer (13*b*) has an arithmetic mean surface roughness equal to or greater than 0.04 μm and equal to or less than 0.6 μm.

The sixth aspect enables lightening the local load to be placed on a packaging carrier tape, thus further reducing the contamination to be caused by the shavings off the surface of the tape.

In a multilayer varistor (1) according to a seventh aspect, which may be implemented in conjunction with the fifth or sixth aspect, the first high-resistivity layer (13*a*) has an arithmetic mean surface roughness equal to or greater than 0.06 μm and equal to or less than 0.9 μm.

The seventh aspect enables further reducing the chances of causing migration in the first high-resistivity layer (13*a*) and eventually reducing the chances of causing migration in the entire high-resistivity layer (13).

In a multilayer varistor (1) according to an eighth aspect, which may be implemented in conjunction with any one of the first to seventh aspects, the sintered compact (11) has a pair of end faces. The external electrode (14) includes a pair of external electrodes (14) arranged to respectively cover the pair of end faces of the sintered compact (11) via the high-resistivity layer (13). A distance measured, in a direction in which the pair of end faces face each other, between the pair of external electrodes (14) along the at least one planar portion of the sintered compact (11) is shorter than a distance measured, in the direction in which the pair of end faces face each other, between the pair of external electrodes (14) along the at least one corner portion of the sintered compact (11).

Although a known multilayer varistor causes migration particularly frequently if there is a short distance between the external electrodes as measured along the planar portion of the sintered compact, the eighth aspect enables significantly reducing the chances of causing migration. Consequently, a significant advantage is achieved by applying the present disclosure.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A multilayer varistor comprising:

a sintered compact having, on a surface thereof, at least one planar portion and at least one corner portion;

an internal electrode provided inside the sintered compact;

a high-resistivity layer arranged to cover the at least one planar portion and the at least one corner portion of the sintered compact at least partially; and an external electrode arranged to cover the high-resistivity layer partially and electrically connected to the internal electrode, the high-resistivity layer including: a first high-resistivity layer covering the at least one planar portion; and a second high-resistivity layer covering the at least one corner portion, the first high-resistivity layer having a larger average thickness than the second high-resistivity layer.

2. The multilayer varistor of claim 1, wherein the second high-resistivity layer has an average thickness equal to or greater than 0.007 μm and equal to or less than 3.3 μm.

3. The multilayer varistor of claim 1, wherein the first high-resistivity layer has an average thickness equal to or greater than 0.01 μm and equal to or less than 5 μm.

4. The multilayer varistor of claim 1, wherein the first high-resistivity layer has a larger arithmetic mean surface roughness than the second high-resistivity layer.

5. The multilayer varistor of claim 1, wherein the sintered compact has a pair of end faces, the external electrode includes a pair of external electrodes arranged to respectively cover the pair of end faces of the sintered compact via the high-resistivity layer, and a distance measured, in a direction in which the pair of end faces face each other, between the pair of external electrodes along the at least one planar portion of the sintered compact is shorter than a distance measured, in the direction in which the pair of end faces face each other, between the pair of external electrodes along the at least one corner portion of the sintered compact.

6. A multilayer varistor comprising:

a sintered compact having, on a surface thereof, at least one planar portion and at least one corner portion;

an internal electrode provided inside the sintered compact;

a high-resistivity layer arranged to cover the at least one planar portion and the at least one corner portion of the sintered compact at least partially; and an external electrode arranged to cover the high-resistivity layer partially and electrically connected to the internal electrode, the high-resistivity layer including: a first high-resistivity layer covering the at least one planar portion; and a second high-resistivity layer covering the at least one corner portion, the first high-resistivity layer having a larger arithmetic mean surface roughness than the second high-resistivity layer.

7. The multilayer varistor of claim 6, wherein the second high-resistivity layer has an arithmetic mean surface roughness equal to or greater than 0.04 μm and equal to or less than 0.6 μm.

8. The multilayer varistor of claim 6, wherein the first high-resistivity layer has an arithmetic mean surface roughness equal to or greater than 0.06 μm and equal to or less than 0.9 μm.

9. The multilayer varistor of claim 6, wherein the sintered compact has a pair of end faces, the external electrode includes a pair of external electrodes arranged to respectively cover the pair of end faces of the sintered compact via the high-resistivity layer, and a distance measured, in a direction in which the pair of end faces face each other, between the pair of external electrodes along the at least one planar portion of the sintered compact is shorter than a distance measured, in the direction in which the pair of end faces face each other, between the pair of external electrodes along the at least one corner portion of the sintered compact.

* * * * *